US006402222B1

(12) United States Patent
Avitsur

(10) Patent No.: US 6,402,222 B1
(45) Date of Patent: Jun. 11, 2002

(54) SIDE WINDOW VEHICLE SHADE

(76) Inventor: Yair Avitsur, 17 Remez, Kadima (IL)

( * ) Notice: Subject to any disclaimer, the term of this patent is extended or adjusted under 35 U.S.C. 154(b) by 0 days.

(21) Appl. No.: 09/706,873

(22) Filed: Nov. 7, 2000

Related U.S. Application Data

(63) Continuation-in-part of application No. 09/443,342, filed on Nov. 19, 1999, now abandoned.

(51) Int. Cl.$^7$ .................................................. B60J 3/02
(52) U.S. Cl. ...................... 296/97.8; 296/97.1; 296/97.2
(58) Field of Search .............................. 296/97.1, 97.2, 296/97.8

(56) References Cited

U.S. PATENT DOCUMENTS

| | | | | |
|---|---|---|---|---|
| 3,329,461 A | * | 7/1967 | Edgar ........................ | 296/97.1 |
| 3,649,069 A | * | 3/1972 | Zip ............................ | 296/97.1 |
| 4,332,414 A | * | 6/1982 | Surtin ........................ | 296/97.1 |
| 4,606,572 A | * | 8/1986 | Maguire ...................... | 296/95 |
| 4,681,149 A | * | 7/1987 | Tung-Chow ................. | 160/134 |
| 4,932,711 A | * | 6/1990 | Goebel ....................... | 296/97.7 |
| 5,044,686 A | * | 9/1991 | Acenbrack ................. | 296/97.9 |
| 5,598,883 A | * | 2/1997 | Platsis .................... | 160/370.23 |

\* cited by examiner

Primary Examiner—Joseph D. Pape
Assistant Examiner—G. Blankenship
(74) Attorney, Agent, or Firm—Mark M. Friedman

(57) ABSTRACT

A side window vehicle shade including: (a) a sectorially deployable element having an axis of deployment and being spreadable from a folded configuration into a spread configuration and foldable from a spread configuration into a folded configuration; (b) a securing mechanism for securely yet detachably attaching the sectorially deployable element onto a portion of a vehicle, such that by spreading the element from a folded configuration into a spread configuration a sector of the window is shaded and further such that by folding the spread configuration into a folded configuration, the sector is unshaded; and (c) a mechanism having a rotatable disk for spreading and folding the sectorially deployable element, and designed to self retain a partial spread configuration.

23 Claims, 7 Drawing Sheets

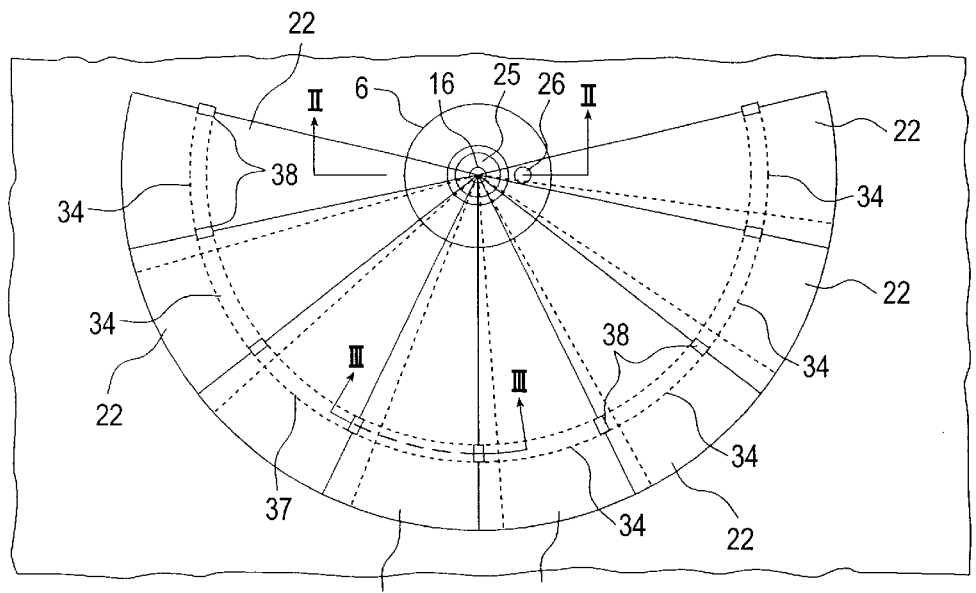
FIG.1 (PriorArt)
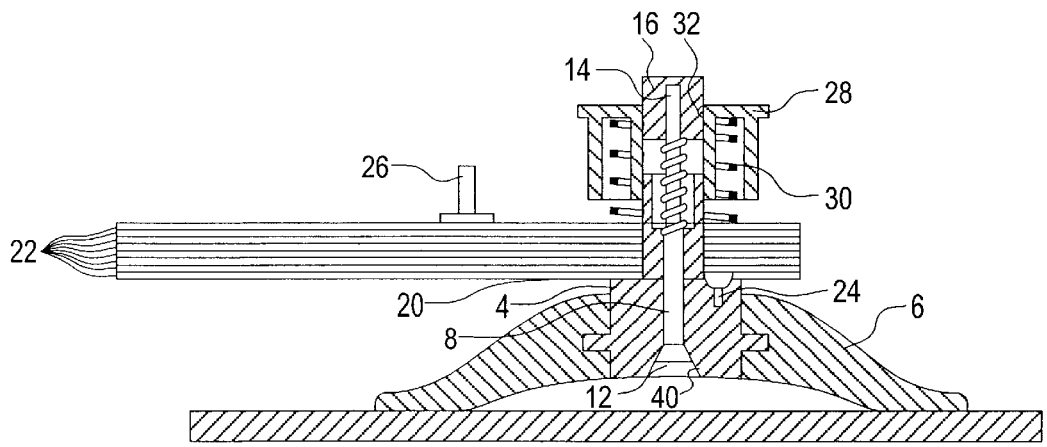
FIG.2 (PriorArt)
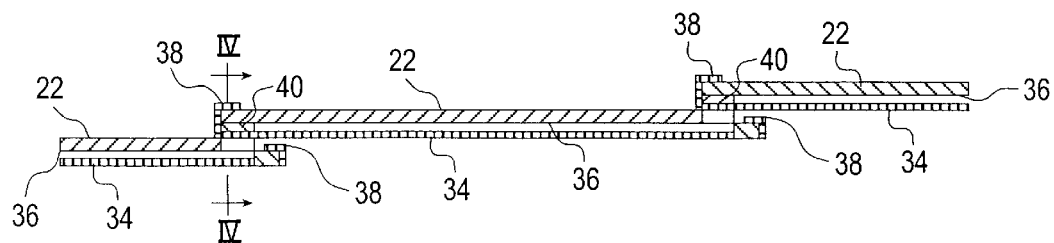
FIG.3

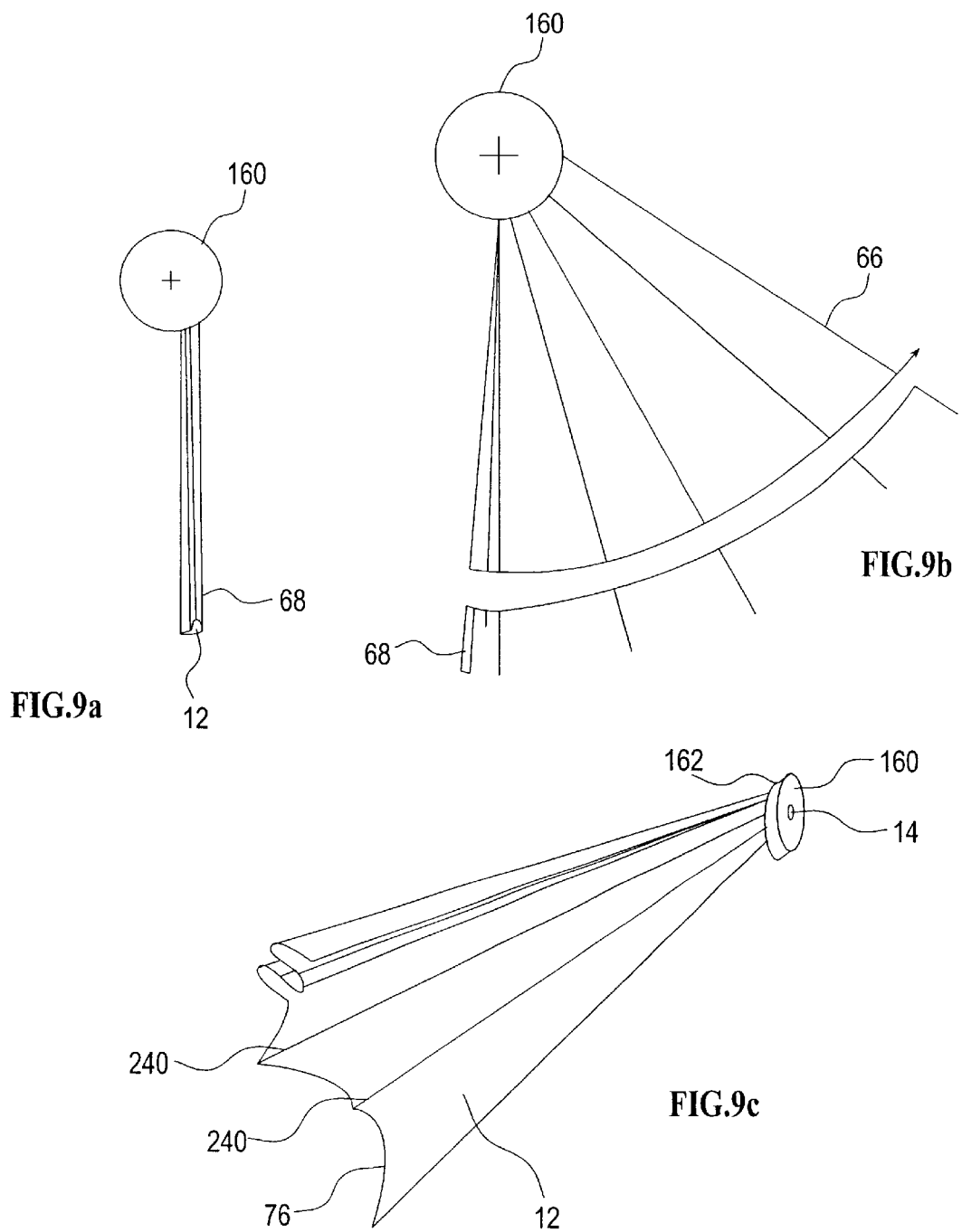

SIDE WINDOW VEHICLE SHADE

This is a continuation-in-part of U.S. patent application Ser. No. 09/443,342 filed Nov. 19, 1999 abandoned.

FIELD AND BACKGROUND OF THE INVENTION

The present invention relates to a vehicle window shade. Specifically, the present invention relates to a foldable side-window shade detachably mounted on an interior surface of the vehicle.

Planet Earth is presently undergoing an accelerated heating process, accompanied by extensive damage to the ozone layer which filters out the harmful ultraviolet portion of the sun's radiation. As a result, exposure to sunlight becomes more dangerous as it may lead to premature aging of the skin and/or skin cancer. Also, car components, typically those components made of plastic or cloth material and which are exposed to direct sunlight may deteriorate or fade in a faster rate.

Window shades are well known in the art and are traditionally used to shade a window from light, typically sunlight. The use of window shades gains a growing importance in view of the increase in ultraviolet radiation reaching the Earth.

Indeed, in view of the public awareness to the effects described above, vehicle shade accessories have been developed to reduce the exposure of the driver and the vehicle passengers to sunlight.

Such shade accessories may be broken into two main categories according to their mode of use.

One category includes those accessories which are attached to the front and rear windows of the vehicle and serve to reduce heating of the interior of the vehicle when exposed to sunlight while parked. Falling into this category are, for example, cardboard-made accordion-like devices which can be extended in use and collapsed or folded when stored and rollable screens contained in a housing attached to the front window in a rolled configuration when not in use and unrolled when used. Shade accessories in this category are typically fully opaque, some of which are even reflective and as such can only be used and are dedicated for use only in parked cars.

Another category includes those shade accessories which are attached to the side and optionally the rear vehicle windows and which serve to reduce the intensity of sunlight to which the driver as well as the passengers are exposed to while the vehicle is driven. Some accessories of this category, such as curtains, are opaque and do not meet the requirements made by certain regulations, according to which the driver must have a clear eye sight with the vehicle's side mirrors, and by other regulations requiring that law enforcement personnel approaching the vehicle must be able to easily see the upper body portion of the vehicle occupants, both driver and passengers.

In many cases, accessories categorized under this category are made of a perforated surface, which reduces sunlight intensity, however, fails to specifically filter certain wavelengths thereof, such as the damaging ultraviolet radiation. In addition, such perforated surfaces are typically attached to the window itself via stickers or vacuum devices, limiting the use of such accessories.

One typical device is disclosed in U.S. Pat. No. 3,649,069 to Zip. U.S. Pat. No. 3,649,069 teaches a glare shield for automobiles consisting of a spindle having a suction cup at one end thereof for mounting on an automobile windshield or window glass at right angles to the glass surface, a series of segmentally shaped planar vanes pivoted on the spindle for movement from an angularly aligned, overlapping position to an angularly spread, fan-like position, a mechanism frictionally resisting pivot movement of the vanes, and devices operable to pivot the vanes, adjust the friction mechanism and release the suction cup, all of the devices being operable by a motorist from a single position of his hand. The device taught by U.S. Pat. No. 3,649,069 to Zip is attached to the window itself, such that the device must be removed in order to open the window.

Although it is claimed in the above-mentioned patent that the glare shield can be affixed to a windshield, to a side window, or to any other smooth surface of the vehicle (Column 2, lines 58–59), it should be appreciated that the use of a suction cup is inappropriate when the vehicle is in motion with the window open. The wind rushing into the vehicle, along with jarring vibrations absorbed via the road surface, tend to destabilize the device. This is particularly true when the device is not mounted on the window (where the vacuum effect is relatively effective), but on the interior surface adjacent to the window, which is characteristically less smooth and less appropriate for vacuum attachment than the glass surface of the window.

Moreover, the glare shield disclosed by U.S. Pat. No. 3,649,069 is disadvantageous in that both the mounting mechanism and the shield (see FIGS. 1–2 herein) are complex, bulky, such that the device is substantially impractical.

There is thus a widely recognized need for, and it would be highly advantageous to have, a vehicle side-window shade that is simple and efficient, that is securably but non-permanently deployable, that does not hinder the opening of the side window, and that continues to provide shade during and after the window is opened. It would be of further advantage to have a side-window shade that is thin and compact, such that the mounting of the shade is not is not a source of discomfort for the driver or passengers.

SUMMARY OF THE INVENTION

According to one aspect of the present invention there is provided a side window vehicle shade comprising: (a) a sectorially deployable element having an axis of deployment, the element being spreadable from a folded configuration into a spread configuration and foldable from a spread configuration into a folded configuration; (b) a securing mechanism for securely yet detachably attaching the sectorially deployable element onto a portion of the vehicle being in proximity to the side window of the vehicle, such that by spreading the element from a folded configuration into a spread configuration a sector of the window is shaded and further such that by folding the spread configuration into a folded configuration, the sector is unshaded; and (c) means for spreading and folding the element, the means designed to self retain a partial spread configuration.

According to another aspect of the present invention there is provided a method of shading a side window of a vehicle, the method comprising the steps of: (a) providing a side window vehicle shade including: (i) a sectorially deployable element having an axis of deployment and being spreadable from a folded configuration into a spread configuration and foldable from the spread configuration into the folded configuration; (ii) a securing mechanism for securely yet detachably attaching the element onto a portion of the vehicle being in proximity to the window of the vehicle; and (iii) means for spreading and folding the element, and (b) securely yet detachably attaching via the mechanism the element onto the portion of the vehicle being in proximity to the window of the vehicle, such that by spreading the element from the folded configuration into the spread configuration a sector of the window is shaded and further such that by folding the spread configuration into the folded configuration the sector is unshaded.

According to further features in the preferred embodiments of the invention described below, the means for spreading and folding the element include a rotatable disk.

According to still further features in the preferred embodiments of the invention described below, the means include a ratchet mechanism.

According to still further features in the preferred embodiments of the invention described below, the means include a ratchet-type mechanism.

According to still further features in the preferred embodiments of the invention described below, the ratchet-type mechanism includes a rotatable disk and a fixed disk, the fixed disk being substantially concentric and co-facial with the rotatable disk.

According to still further features in the preferred embodiments of the invention described below, the rotatable disk and the fixed disk have complementary protrusions and recesses.

According to still further features in the preferred embodiments of the invention described below, the ratchet-type mechanism further includes a stretchable connecting element for preventing a detachment of the rotatable disk and the fixed disk.

According to still further features in the preferred embodiments of the invention described below, the sectorially deployable element includes a single, continuous fabric.

According to still further features in the preferred embodiments of the invention described below, the single, continuous fabric includes means for neatly folding the fabric.

According to still further features in the preferred embodiments of the invention described below, the means for neatly folding the fabric include eyelets attached to the fabric. Alternatively, the means include guide rods attached to the fabric.

According to still further features in the preferred embodiments of the invention described below, the securing mechanism includes at least two clasps designed to detachably and reversibly secure the vehicle shade to an interior frame.

According to still further features in the preferred embodiments of the invention described below, the clasps are adjustable according to a width of the interior frame.

According to still further features in the described preferred embodiments, the spread configuration is characterized by a substantially triangular section shape.

According to still further features in the described preferred embodiments, the spread configuration is characterized by a substantially semicircular section shape.

The present invention successfully addresses the shortcomings of the presently known configurations by providing a side window vehicle shade which is easily, securely, and detachably mounted, is easily operated, does not limit the functionality of a vehicle window, allows the driver to maintain eye contact with the side mirrors of the vehicle and allows law enforcement personnel to view the upper body portions of vehicle occupants.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a fragmentary elevational view of the interior surface of an automobile windshield, showing the prior-art glare shield of U.S. Pat. No. 3,649,069 to Zip applied operatively thereto, the shield being extended to its maximum area;

FIG. 2 is a fragmentary, enlarged sectional view taken on line II—II of FIG. 1, with the vanes of the prior-art glare shield folded into angularly aligned relation;

FIG. 3 is an enlarged, fragmentary sectional view taken on line III—III of FIG. 1;

FIGS. 6a and 6b provide side views of a ratchet-type mechanism that can be used as a means for opening and closing the sectorially deployable element of the present invention, wherein FIG. 6a illustrates a locked configuration of the mechanism, and FIG. 6b illustrates an unlocked configuration of the mechanism;

FIG. 7b is a schematic, partially axial, partially radial view depiction of the disk shown in FIG. 7a;

FIG. 9a is a schematic depiction of a sectorially deployable element according to the present invention shown in a folded configuration;

FIG. 9b is a schematic depiction of the sectorially deployable element of FIG. 9a, shown in the process of being spread;

FIG. 9c is a schematic depiction of the sectorially deployable element of FIG. 9a, shown in a partially spread configuration.

DESCRIPTION OF THE PREFERRED EMBODIMENTS

Figure 4:
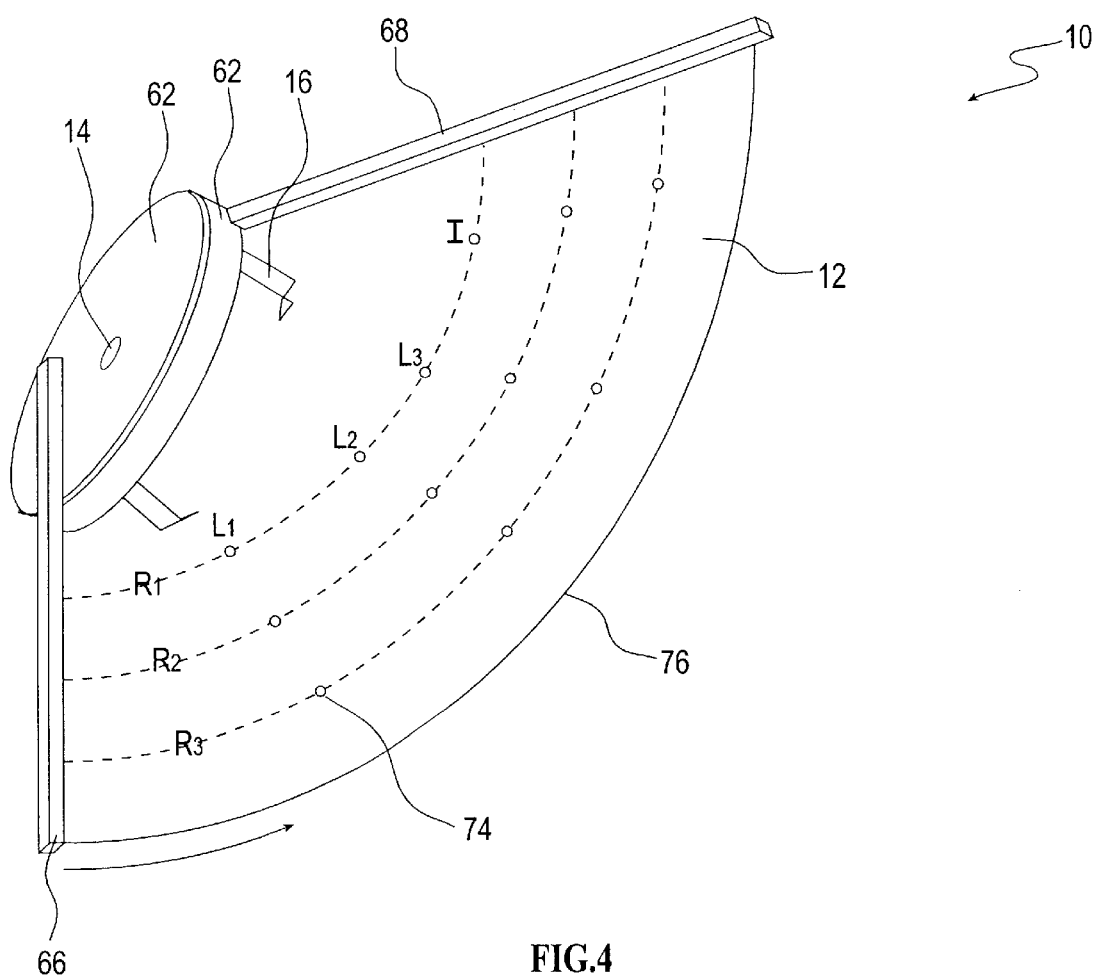
FIG. 4 illustrates one embodiment of a vehicle window shade according to the present invention.

The present invention is of a sectorially deployable element which can be used to shade the side window of a vehicle. The present invention is further of a method of using a sectorially deployable element to shade a vehicle window. The use of a sectorially deployable element as a vehicle window shade has certain advantages over prior art designs in that it is easily mounted, secured, detached and operated. Moreover, it does not limit the functionality of a vehicle window, allowing the driver to maintain eye contact with the side mirrors of the vehicle and allowing law enforcement personnel to view the upper body portions of vehicle occupants.

The principles and operation of a sectorially deployable element and its use according to the present invention may be better understood with reference to the drawings and accompanying descriptions.

The features and advantages of the present invention are better understood against the background of the prior art. The glare shield taught by U.S. Pat. No. 3,649,069 to Zip is presented in FIGS. 1–3. The glare shield includes a tubular spindle 4 having one end thereof securely molded centrally in a rubber suction cup 6, coaxially therewith and extending outwardly therefrom. The bore 8 of the spindle opens through both ends thereof, and communicates with the interior of cup 6, the inner end of the bore forming a conical valve seat 10 in which is disposed a correspondingly conical valve plug 12 affixed to a valve stem 14 which extends outwardly through bore 8 beyond the outer end of the spindle. A pushbutton 16 is affixed to the extended end of the stem, and a helical compression spring 18 is disposed about the stem, bearing at one end against pushbutton 16 and at its opposite end against the spindle, whereby to urge valve plug 12 into airtight sealing engagement with valve seat 10. Pressure on pushbutton 16 will compress spring 13 to open valve 12.

Just outwardly of cup 6, spindle 4 is externally reduced in diameter to form an outwardly facing annular shoulder 20 thereon. A series of planar, segmentally shaped vanes 22 are assembled in stacked relation on the reduced portion of the spindle, so that the innermost vane rests against shoulder 20. The vanes extend radially from spindle 4, and are all rotatable about the spindle as an axis with the exception of the innermost vane, which is secured non-rotatably to shoulder 20 by means of a pin 24 extending therethrough and into the shoulder. The outermost vane has a pin 26 fixed therein in offset relation from the spindle, and extending outwardly therefrom parallel to the spindle. The vanes may be formed of sheet metal, in which case they would of course be opaque. but preferably are formed of a transparent but tinted material. such as thin sheet plastic, as shown.

Spindle 4 extends outwardly from the outermost vane 22. and has a cap 28 threaded on the extended end thereof. The cap encloses a helical compression spring 30 bearing at one end against the cap and at its opposite end against outermost vane 22 whereby to urge the stack of vanes yieldably against shoulder 20. Cup 28 is tubular, having a bore 32 formed therein to accommodate valve stem 14 and pushbutton 16 of valve 12. The pushbutton extends slightly outwardly from the face of cap 28, and is axially slidable in bore 32. Valves 22 may be turned by their rotation on spindle 4 either to an angularly aligned coextensive relation with the fixed innermost vane, or be angularly spread to form a fan-shaped shield as shown in FIG. 1, or of course to any intermediate position.

There are means provided (see FIG. 3) for preventing successive vanes from ever moving out of overlapping relation, which would of course interrupt the continuity of the shield, and for permitting rotary adjustment of all the vanes by manipulation of one vane. Considering the surfaces of the vanes facing suction cup 6 as their forward faces, this means includes an arcuate strip 34 disposed closely adjacent and parallel to the forward surface of each vane, whereby to form 2 narrow opening 36 therebetween. The strip is disposed concentrically to spindle 4, and is affixed to its associated vane by having its end portions 38 bent to overlap the rearward face of the vane at its respectively opposite sides, and secured thereto. Each vane has a narrow strip 40 thereof, adjacent the leading edge thereof as the vanes are spread in a counterclockwise direction, as viewed in FIG. 1, or to the right as viewed in FIG. 3, offset rearwardly and engaged slidably in the narrow opening 36 formed by strip 34 of the next rearward vane. By grasping pin 26 of the rearmost vane and moving it around the spindle whereby the rearmost vane is turned, the rearmost vane pivots all of the remaining vanes to maintain the continuity of the shield.

The above-described glare shield disclosed by U.S. Pat. No. 3,649,069 is disadvantageous in that both the mounting mechanism and the shield are extremely complex, and are fabricated from a large plurality of components. Moreover, the glare shield is bulky. When mounted on a side window, the device extends well away from the window, and into the head and/or shoulder space of the motorist. In addition, though it is claimed in the above-mentioned patent that the glare shield can be affixed to a windshield, to a side window, or to any other smooth surface of the vehicle (Column 2, lines 58–59), it should be appreciated that the use of a suction cup is inappropriate when the vehicle is in motion with the window open. The wind rushing into the vehicle, along with jarring vibrations absorbed via the road surface, tend to destabilize the device. This is particularly true when the device is not mounted on the window (where the vacuum effect is relatively effective), but on the interior surface adjacent to the window, which is characteristically less smooth and less appropriate for vacuum attachment than the glass surface of the window. Thus, the above-described glare shield has several glaring impediments which render it and other such devices substantially impractical.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 4 illustrates one embodiment of a vehicle window shade according to the present invention, which is referred to hereinbelow as vehicle window shade, or shade, 10.

Shade 10 according to the present invention includes a sectorially deployable element 12. Element 12 has an axis of deployment 14 and is spreadable from a folded configuration into a spread configuration, either partially spread or fully spread and foldable from the spread configuration into its folded configuration. Shade 10 according to the present invention further includes a securing mechanism 16 for attaching element 12 on to the interior frame (see FIGS. 8a–8c) of a vehicle.

The means for opening and closing element 12 about axis of deployment 14 is preferably accomplished by two disks 60, 62, concentrically disposed about axis of deployment 14, and rotatable with respect to one another. Preferably, disk 60 is rotatable and disk 62 is stationary. Disks 60, 62, have co-facial, contacting surfaces, such that, when rotated with respect to one another, a frictional force is established in the direction opposite the rotation. Once rotation has ceased, the frictional force maintains the relative position of disks 60, 62.

Consequently, when sectorially deployable element 12 is moved about axis of deployment 14 (preferably by means of positioning rod 66), a small frictional force between disk 60 and disk 62 must be overcome. Once, in position, however, this frictional force maintains element 12 and positioning rod 66 securely in place.

Figure 5:
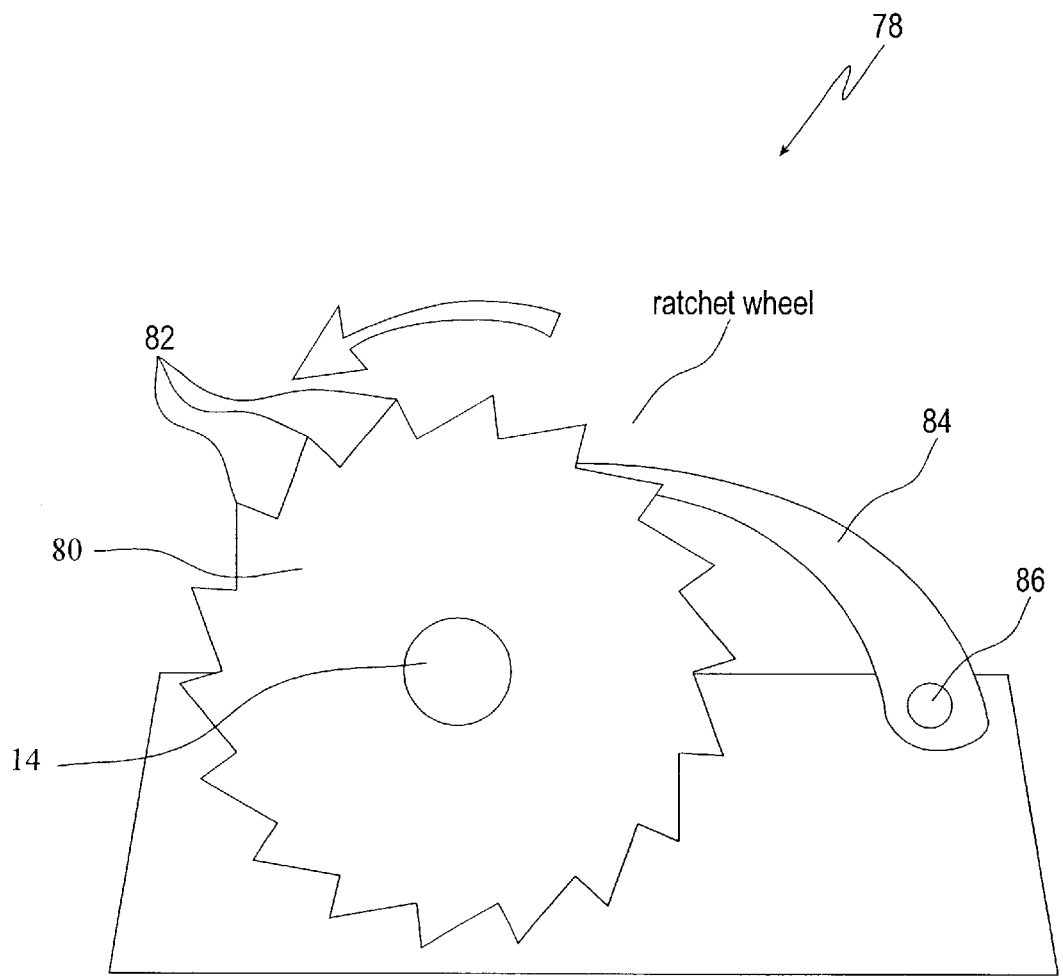
FIG. 5 illustrates a ratchet mechanism that can be used as a means for opening and closing the sectorially deployable element of the present invention.

Optionally, the means for opening and closing element 12 about axis of deployment 14 can be accomplished by a ratchet mechanism 78 as illustrated in FIG. 5. Rotatable disk (ratchet wheel) 80, fitted with pointed teeth 82 along at least a portion of the disk 80 circumference, is configured to pivot at axis of deployment 14. Pawl 84 pivots on fixed axis 86 and rides over the pointed teeth 82 as rotatable disk 80 is turned in a counter-clockwise fashion. However, pawl 84 prevents rotation of rotatable disk 80 in a clockwise direction.

Ratchet mechanism 78 can be disposed behind and affixed to a rotatable disk such as rotatable disk 60 (see FIG. 4). Thus, when rotatable disk 60 can be turned in a counter-clockwise direction (preferably by means of positioning rod 66), in fixed increments, the increment size depending on the number of teeth in a given angle of rotation. Rotatable disk 60 cannot rotate back in the clockwise direction without resetting the pawl 84 position, nor can rotatable disk 60 rotate forward in the clockwise direction without additional force applied by the motorist, due to the force exerted by pawl 84 and fixed axis 86 on rotatable disk (ratchet wheel) 80.

Figure 6:
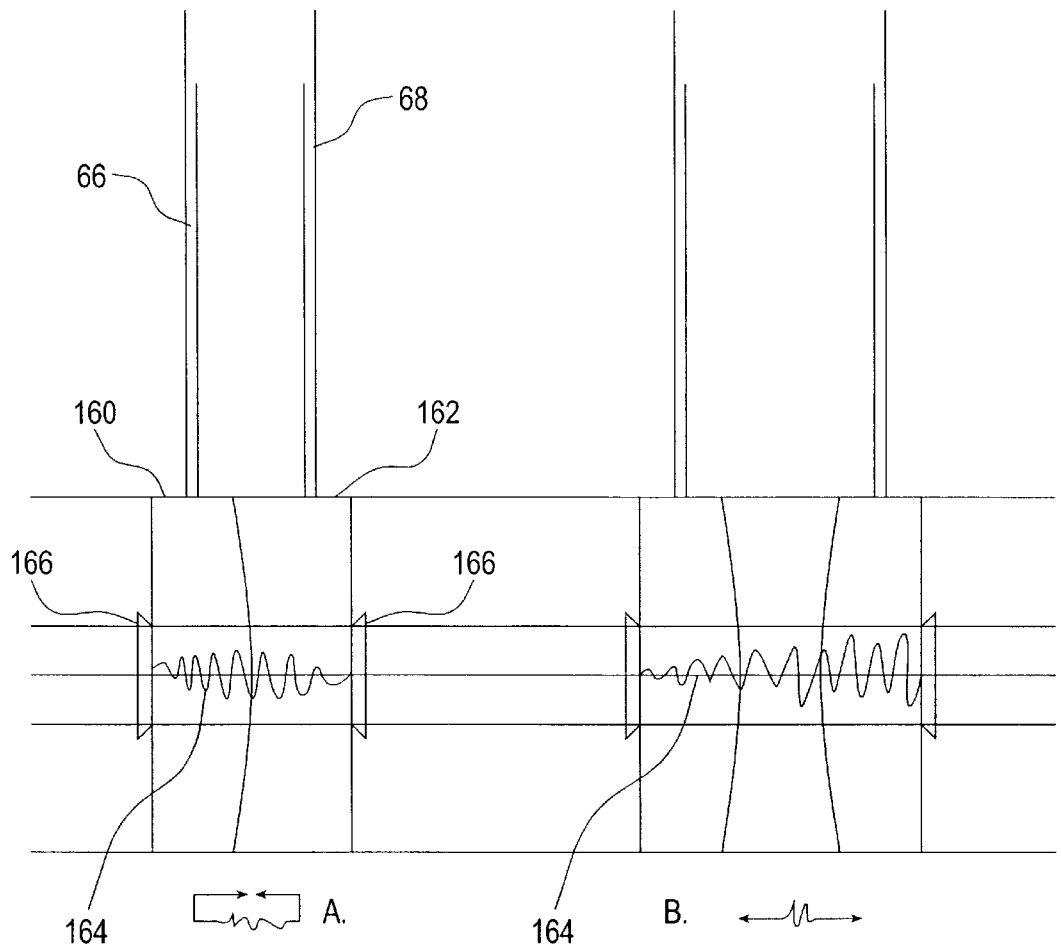

An alternative preferred embodiment is of a ratchet-type mechanism, illustrated schematically in the side view provided in FIGS. 6a and 6b. Rotatable disk 160 and fixed disk 162 are aligned in concentric fashion, with the diameter of the two disks 160, 162 preferably being substantially identical. Disks 160, 162 are affixed one to another by central spring 164, which passes through the center of the disks 160, 162. Central spring 164 is equipped with a slight lip or fitting on each end 166, such that disks 160, 162 cannot be disattached from spring 164.

The term "ratchet-type mechanism" is used to apply to a mechanism that is rotatable in both directions, and requires a measure of disengagement between the disks in order to allow the disks to rotate with respect to one another.

Figure 7B:
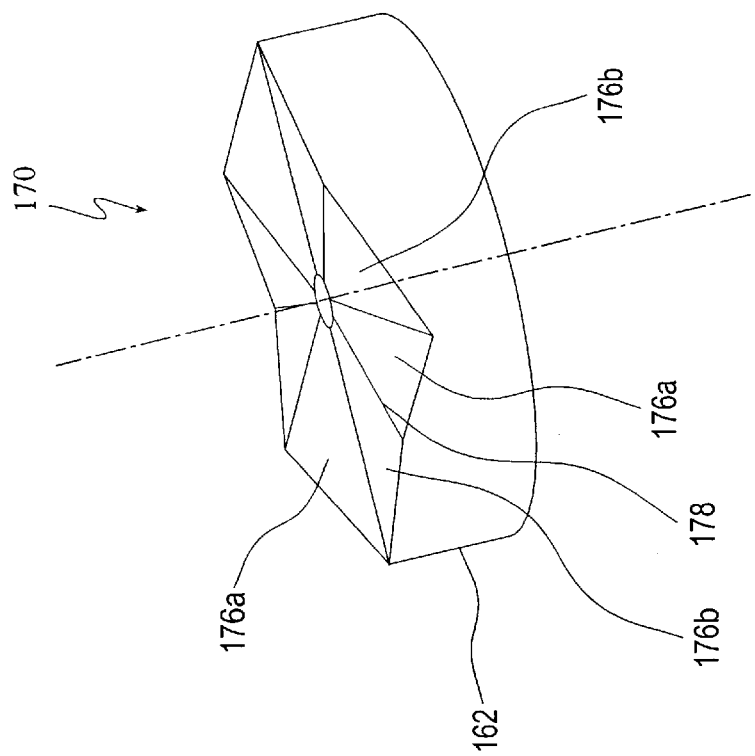
Figure 7A:
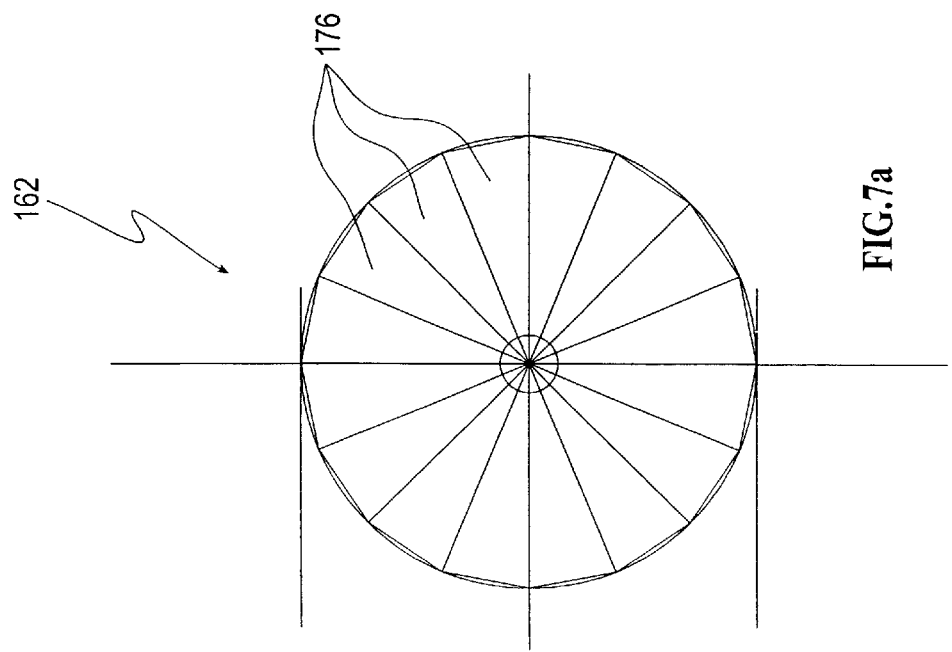
FIG. 7a is a schematic, axial depiction of a disk having wedge-faced sections, the disk being used in the mechanism of FIGS. 6a–6b.

The inner surfaces of disks 160, 162 are equipped with complementary recesses and protrusions, which, along with the force exerted by central spring 164, secure rotatable disk 160 to fixed disk 162 in a fixed position. These complementary recesses and protrusions can be of various types known to those skilled in the art. In one presently-preferred embodiment (FIGS. 7a, 7b), a schematic view of a disk (either rotatable disk 160 or fixed disk 162) is provided. >From an axial view (FIG. 7a) of disk 162 (by way of example), the inner surface of disk 162 is made up of wedge-faced sections 176. From a partially axial, partially radial view (FIG. 7b) of disk 162, wedge-faced sections 176 (FIG. 7a) are seen to be alternating, contoured surfaces, identified herein as wedge-faced section 176a and wedge-faced section 176b. On the left side of wedge-faced section 176a, wedge-faced section 176a meets with the right side of wedge-faced section 176b to form a ridge 178. On the right side of wedge-faced section 176a, wedge-faced section 176a meets with the left side of wedge-faced section 176b to form a recess or groove 178.

In order to rotate rotatable disk 160 and thereby at least partially open or close element 12, rotatable disk 160 is pulled slightly apart from fixed disk 162 (as shown in FIG. 6b) by the motorist, such that the above-described ridges are substantially separated from the above-described recesses. Positioning rod 66 can then be rotated in a discrete fashion to open or close element 12. The number of ridges (or recesses) on the inner surface 170 of disk 162 determines the number of stable (secure) positions between rotatable disk 160 and fixed disk 162.

Figure 8C:
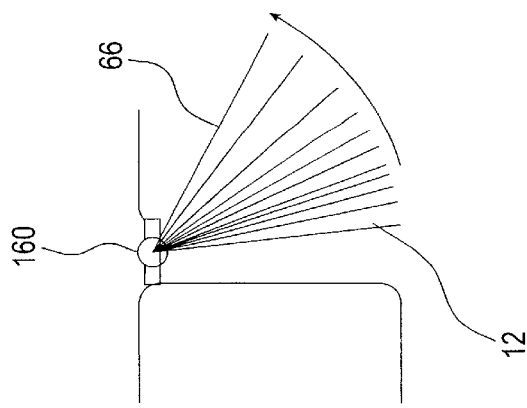
FIGS. 8a–8c are schematic drawings of the device according to the present invention, in which a preferred embodiment of the securing mechanism is provided.
Figure 8B:
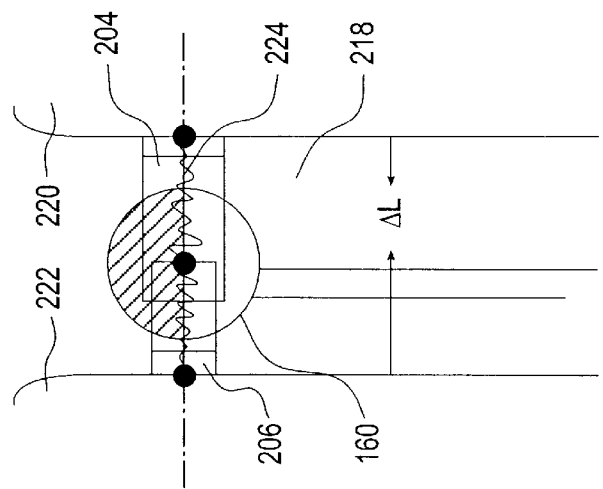
Figure 8A:
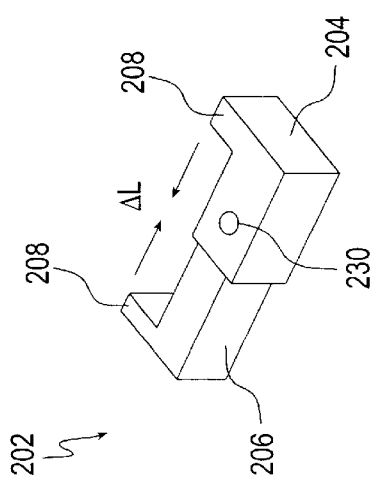

FIGS. 8a–8c are schematic drawings of the device according to the present invention, in which a preferred embodiment of the securing mechanism 202 is provided. Securing mechanism 202 detachably attaches the sectorially deployable element to the interior frame of the vehicle. The securing is detachable, leaving no marks or holes on the interior surface. Despite being detachable, the sectorially deployable element is securely held in place, the vibrations of the road and wind currents from open windows notwithstanding. Outer hollow profile 204 encompasses the interior end of inner hollow profile 206. At the far end of each profiles 204,206, profiles 204,206 have substantially right-angle bends, forming protrusions or clasps 208. The space ΔL between clasps 208 is variable, depending on the extent of overlap between outer hollow profile 204 and inner hollow profile 206. Space ΔL may be the width of the interior strip 218 of the vehicle frame between front 220 and back 222 side windows (as shown in FIG. 8b). The securing of mechanism 202 can realized in several ways. For example, in the preferred embodiment provided in FIG. 8b, mechanism 16 encompasses interior strip 218, with clasps 208 pressing on both sides of interior strip 218. The pressure may be provided by a spring mechanism 224 disposed within securing mechanism 202. In a preferred embodiment, outer hollow profile 204 is equipped with a threaded screw hole 230 on an outer facing, preferably near the interior end of outer hollow profile 204. A screw or bolt (not shown) is screwed through threaded screw hole 230, such that the end of the screw contacts and holds in place inner hollow profile 202. The screw may be equipped with a winged head to facilitate the tightening or loosening of securing mechanism 202.

FIG. 8b shows the ratchet-type mechanism of FIGS. 6a–6b mounted on securing mechanism 202. Preferably, fixed disk 162 (behind rotatable disk 160) is affixed to outer hollow profile 204, as shown in FIG. 8b. Once the device is secured to the interior frame, positioning rod 66 can be maneuvered to open (or subsequently to close) sectorially deployable element 12 to the desired position (see also FIGS. 9a–9c). By spreading element 12 from its folded configuration (FIGS. 8b, 9a) into any of a plurality of spread configurations (FIGS. 8c, 9b), a sector of window 220 is shaded. By folding any of the spread configurations into the folded configuration, that sector becomes unshaded.

In sharp contrast to prior art devices, which are sectorially deployable by means of a plurality of vanes, the sectorially deployable element 12 of the present invention is preferably a single, continuous fabric. Structural support for element 12, if necessary, is provided by positioning rod 66 and by support rod 68.

To enhance the folding of element 12 in a neat and reversible fashion, a preferred embodiment of the present invention (shown in FIG. 4) utilizes eyelets 74 affixed to element 12 and aligned in several groups of radial lines (or columns) between axis of deployment 14 and the long, curved edge 76 of the vehicle window shade 10. Preferably, three or more rows R1,R2,R3 of eyelets 74 provide element 12 with crisp folded edges along each radial line L1,L2,L3, L4 having eyelets 74. Preferably, element 12 has at least four radial lines L1,L2,L3,L4 of eyelets 74, such that vehicle window shade 10 can be as compact as possible in a closed position.

Alternatively (FIG. 9c), element 12 can be equipped with thin guide rods or fibers 240 disposed along or inside element 12 in a radial fashion between axis of deployment 14 and the long, curved edge 76 of element 12. These guide rods 240 allow element 12 to be folded in a neat and crisp fashion.

According to preferred embodiments of the present invention sectorially deployable element 12 is designed to self retain a partial spread configuration, as described above and as illustrated in FIG. 9c.

Further according to the present invention there is provided a method of shading a vehicle window. The method according to this aspect of the present invention is effected by implementing the following method steps, in which, in a first step, a vehicle window shade as described hereinabove is provided. Then, the vehicle window shade is attached via the securing mechanism onto a portion of a vehicle in proximity to a window of the vehicle, such that by spreading the element from its folded configuration into a spread configuration a sector of the window is shaded, and further such that by folding the spread configuration into the folded configuration that sector is unshaded.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A side window vehicle shade comprising:
   (a) a sectorially deployable element having an axis of deployment, said element being spreadable from a folded configuration into a spread configuration and foldable from said spread configuration into said folded configuration;
   (b) a securing mechanism for securely yet detachably attaching said element onto a portion of a vehicle, such that by spreading said element from said folded configuration into said spread configuration a sector of said window is shaded and further such that by folding said spread configuration into said folded configuration said sector is unshaded, and
   (c) means for spreading and folding said element, said means designed to self retain a partial spread configuration,
   wherein said means for spreading and folding is actuated by turning a rotatable disk.

2. The side window vehicle shade of claim 1, wherein said means for spreading and folding include a ratchet mechanism.

3. A side window vehicle shade comprising:
   (a) a sectorially deployable element having an axis of deployment, said element being spreadable from a folded configuration into a spread configuration and foldable from said spread configuration into said folded configuration;
   (b) a securing mechanism for securely yet detachably attaching said element onto a portion of a vehicle, such that by spreading said element from said configuration into said spread configuration a sector of said window is shaded and further such that by folding said spread configuration into said configuration said sector is unshaded, and
   (c) means for spreading and folding said element, said means designed to self retain a partial spread configuration,
   wherein said means for spreading and folding include a ratchet-type mechanism for performing said spreading and folding in pre-determined increments.

4. The side window vehicle shade of claim 3, wherein said means for spreading and folding include a rotatable disk for spreading and folding said element.

5. The side window vehicle shade of claim 4, wherein said ratchet-type mechanism further include a fixed disk, said fixed disk being substantially concentric and co-facial with said rotatable disk.

6. The side window vehicle shade of claim 4, wherein said ratchet-type mechanism further includes a fixed disk, said rotatable disk and said fixed disk having complementary protrusion and recesses.

7. The side window vehicle shade of claim 6, wherein said ratchet-type mechanism further includes a stretchable connecting element for preventing a detachment of said rotatable disk and said fixed disk.

8. The side window vehicle shade of claim 3, wherein said sectorially deployable element includes a single, continuous fabric.

9. A side window vehicle shade comprising:
   (a) a sectorially deployable element having an axis of deployment, said element being spreadable from a folded configuration into a spread configuration and foldable from said spread configuration into said folded configuration;
   (b) a securing mechanism for securely yet detachably attaching said element onto a portion of a vehicle, such that by spreading said element from said folded configuration into said spread configuration a sector of said window is shaded and further such that by folding said spread configuration into said folded configuration said sector is unshaded, and
   (c) means for spreading and folding said element, said means designed to self retain a partial spread configuration,
   wherein said sectorially deployable element includes a single, continuous fabric having means for folding said fabric, said means for folding said fabric including guide rods attached to said fabric.

10. The side window vehicle shade of claim 9, wherein said means for folding said fabric include eyelets attached to said fabric.

11. A side window vehicle shade comprising:
    (a) a sectorially deployable element having an axis of deployment, said element being spreadable from a folded configuration into a spread configuration and foldable from said spread configuration into said folded configuration;
    (b) a securing mechanism for securely yet detachably attaching said element onto a portion of a vehicle, such that by spreading said element from said folded configuration into said spread configuration a sector of said window is shaded and further such that by folding said spread configuration into said folded configuration said sector is unshaded, and
    (c) means for spreading and folding said element, said means designed to self retain a partial spread configuration,
    wherein said securing mechanism includes at least one clasp designed and configured to detachably and reversibly secure the vehicle shade to said portion of said vehicle in a substantially suspended disposition.

12. The side window vehicle shade of claim 11, wherein said at least one clasp includes at least two clasps.

13. The side window vehicle shade of claim 11, wherein said portion of said vehicle is a substantially vertical strip.

14. The side window vehicle shade of claim 11, wherein said at least one clasp is adjustable according to a width of said portion of said vehicle.

15. A method of shading a side window of a vehicle, the method comprising the steps of:

(a) providing a side window vehicle shade including:
   (i) a sectorially deployable element having an axis of deployment and being spreadable from a folded configuration into a spread configuration and foldable from said spread configuration into said folded configuration;
   (ii) a securing mechanism for securely yet detachably attaching said element onto a portion of the vehicle; and
   (iii) means for spreading and folding said element, said means for spreading and folding including a mechanism that is one of a ratchet mechanism and a ratchet-type mechanism for performing said spreading and folding in pre-determined increments, and
(b) securely yet detachably attaching said element from said portion of the vehicle by means of said securing mechanism, such that by spreading said element from said folded configuration into said spread configuration a sector of the side window is shaded and further such that by folding said spread configuration into said folded configuration said sector is unshaded.

16. The method of claim 15, wherein said sectorially deployable element includes a single, continuous fabric.

17. The method of claim 15, wherein said means include a rotatable disk.

18. The method of claim 17, wherein said mechanism is a ratchet-type mechanism, and wherein said ratchet-type mechanism further includes a fixed disk, said fixed disk being substantially concentric and co-facial with said rotatable disk.

19. The method of claim 17, wherein said mechanism is a ratchet-type mechanism, and wherein said ratchet-type mechanism further includes a fixed disk, said rotatable disk and said fixed disk having complementary protrusions and recesses.

20. A method of shading a side window of a vehicle, the method comprising the steps of:
   (a) providing a side window vehicle shade including:
      (i) a sectorially deployable element having an axis of deployment and being spreadable from a folded configuration into a spread configuration and foldable from said spread configuration into said folded configuration;
      (ii) a securing mechanism for securely yet detachably attaching said element onto a portion of the vehicle, said securing mechanism including at least one clasp, and
      (iii) means for spreading and folding said element, and
   (b) securely yet detachably suspending said element from said portion of the vehicle by means of said securing mechanism, such that by spreading said element from said folded configuration into spread configuration a sector of the side window is shaded and further such that by folding said spread configuration into said folded configuration said sector is unshaded.

21. The side window vehicle shade of claim 20, wherein said portion of said vehicle is a substantially vertical strip.

22. The side window vehicle shade of claim 20, further comprising the step of:
   (c) adjusting and securing said at least one clasp according to a width of said portion of the vehicle.

23. The method of claim 20, wherein said sectorially deployable element includes a single, continuous fabric having means for folding said fabric, said means for folding said fabric including guide rods attached to said fabric.

* * * * *